US012734884B2

(12) United States Patent
Koch

(10) Patent No.: US 12,734,884 B2
(45) Date of Patent: Sep. 15, 2026

(54) DISPLAY DEVICE, DASHBOARD AND TRANSPORTATION MEANS

(71) Applicant: Continental Automotive Technologies GmbH, Hannover (DE)

(72) Inventor: Marcus Koch, Waldbronn (DE)

(73) Assignee: Continental Automotive Technologies GmbH, Hannover (DE)

( * ) Notice: Subject to any disclaimer, the term of this patent is extended or adjusted under 35 U.S.C. 154(b) by 381 days.

(21) Appl. No.: 18/199,472

(22) Filed: May 19, 2023

(65) Prior Publication Data

US 2023/0373303 A1 Nov. 23, 2023

(30) Foreign Application Priority Data

May 20, 2022 (DE) ..................... 10 2022 205 052.5

(51) Int. Cl.

| | |
|---|---|
| ***B60K 35/50*** | (2024.01) |
| ***B60K 35/22*** | (2024.01) |
| ***B60K 35/53*** | (2024.01) |
| ***B60K 37/00*** | (2024.01) |
| ***B60R 11/02*** | (2006.01) |

(52) U.S. Cl.

CPC .............. *B60K 35/50* (2024.01); *B60K 35/22* (2024.01); *B60K 35/53* (2024.01); *B60K 37/00* (2013.01); *B60K 2360/652* (2024.01); *B60R 11/0235* (2013.01)

(58) Field of Classification Search

CPC .............. B60K 35/70; B60K 2360/652; B60K 2360/693; B60K 2360/688; B60K 2360/65; B60K 2360/685; B60K 2360/691; B60K 2360/1523

See application file for complete search history.

(56) References Cited

U.S. PATENT DOCUMENTS

| | | | |
|---|---|---|---|
| 4,112,718 | A | 9/1978 | Logsdon et al. |
| 4,256,340 | A | 3/1981 | Dunchock |
| 4,818,008 | A | 4/1989 | Cressoni |
| 5,443,285 | A | 8/1995 | Boll |

(Continued)

FOREIGN PATENT DOCUMENTS

| | | |
|---|---|---|
| CN | 103742840 A | 4/2014 |
| CN | 104797973 | 7/2015 |

(Continued)

OTHER PUBLICATIONS

Translation of DE 102016004156 (Year: 2016).*

(Continued)

*Primary Examiner* — Amy R Weisberg
*Assistant Examiner* — Veronica M Condo
(74) *Attorney, Agent, or Firm* — COZEN O"CONNOR

(57) ABSTRACT

A display device and a dashboard comprising a display device is disclosed. The disclosure moreover relates to a motor vehicle having such a dashboard. The display device has a display module having a display panel and a housing for receiving the display module. The housing has resilient bistable fastening elements. The latter are designed in such a manner that said fastening elements when responding to a movement of a steering column of the transportation move the display device out of a collision region with the steering column or a steering wheel.

10 Claims, 5 Drawing Sheets

(56) References Cited

U.S. PATENT DOCUMENTS 5,905,477 A 5/1999 Kuwayama et al.
6,149,196 A * 11/2000 Guiard .................. B62D 1/197 296/74
6,175,170 B1 1/2001 Kota et al.
7,692,127 B1 4/2010 Linn et al.
8,727,413 B2 5/2014 Seiller et al.
9,233,649 B2 1/2016 Ceccato et al.
9,573,529 B2 2/2017 Hipshier et al.
9,834,254 B2 12/2017 Staines
9,878,674 B2 1/2018 Dunham et al.
9,979,923 B1 * 5/2018 Nemeth .............. B60R 11/0235
10,065,572 B2 * 9/2018 Kuntze .................. G03B 21/62
10,537,033 B2 * 1/2020 Delmaere ............... G06F 1/181
10,556,556 B2 * 2/2020 Alexander ............. B60R 13/02
10,675,975 B2 6/2020 Krier et al.
10,836,326 B1 11/2020 Yang
11,363,745 B1 6/2022 Duncan et al.
2001/0048265 A1 12/2001 Miller et al.
2005/0138852 A1 6/2005 Yamauchi
2006/0203480 A1 9/2006 Choi
2008/0030648 A1 2/2008 Morita et al.
2008/0043463 A1 2/2008 Park et al.
2008/0068860 A1 3/2008 Peng et al.
2010/0001150 A1 1/2010 Chiu
2010/0090498 A1 4/2010 Jungert et al.
2010/0141867 A1 6/2010 Ogihara et al.
2011/0141702 A1 6/2011 Kiesel et al.
2011/0216527 A1 9/2011 Fan et al.
2011/0304798 A1 12/2011 Tanaka et al.
2012/0063081 A1 * 3/2012 Grunwald ........... B60R 11/0235 361/679.41
2013/0128128 A1 5/2013 Ikuta
2013/0195711 A1 8/2013 Araoka et al.
2014/0301025 A1 10/2014 Liu
2014/0306576 A1 10/2014 Ervin et al.
2016/0009178 A1 * 1/2016 Busse .................... B60K 35/50 361/679.21
2016/0046243 A1 2/2016 Rode et al.
2016/0345045 A1 11/2016 Liu et al.
2016/0362072 A1 12/2016 Xu et al.
2017/0212555 A1 * 7/2017 Fafard .................. G01C 21/203
2017/0249011 A1 * 8/2017 Belley .................... B60K 35/10
2018/0293964 A1 10/2018 Kuehn et al.
2019/0265551 A1 8/2019 Liu et al.
2020/0062191 A1 2/2020 Hayes et al.
2020/0166803 A1 5/2020 Kyoukane et al.
2020/0287109 A1 9/2020 Chang et al.
2020/0292885 A1 9/2020 Liu et al.
2020/0326592 A1 10/2020 Lin et al.
2020/0384861 A1 * 12/2020 Kadam ................... B60R 21/02
2021/0162931 A1 6/2021 Bruegl et al.
2021/0317943 A1 10/2021 Kang et al.
2022/0136539 A1 5/2022 Longo et al.
2022/0227307 A1 7/2022 Shout et al.
2022/0299823 A1 9/2022 Li et al.
2023/0166597 A1 6/2023 Guenther et al.
2023/0202300 A1 6/2023 Badar et al.
2024/0262199 A1 8/2024 Hokari et al.

FOREIGN PATENT DOCUMENTS

CN 204494220 7/2015
CN 107031402 8/2017
CN 209086612 7/2019
CN 210437017 5/2020
CN 112445026 3/2021
CN 112764267 5/2021
CN 215219371 12/2021
CN 215340620 12/2021
CN 114174905 3/2022
CN 216128148 3/2022
DE 4227528 C1 12/1993
DE 4217177 C2 5/1994
DE 102008023469 A1 12/2009
DE 102008052007 A1 4/2010
DE 102014001862 B4 10/2015
DE 102014111676 A1 2/2016
DE 102014221505 A1 4/2016
DE 102016004156 A1 * 9/2016 ............. B60K 35/60
DE 102015010295 A1 2/2017
DE 102016200902 A1 7/2017
DE 202008002037 5/2018
DE 102018110548 A1 * 11/2019 ............. B60K 37/20
DE 102018218328 B3 3/2020
DE 102020112133 A1 11/2021
DE 102020128465 B3 3/2022
DE 102021103740 A1 8/2022
EP 1687185 B1 4/2008
EP 2156261 A1 2/2010
EP 3006773 A1 4/2016
EP 3045340 A1 7/2016
GB 1148694 A 4/1969
JP S60219121 11/1985
JP S6118517 1/1986
JP S6118517 A 1/1986
JP 2006282100 10/2006
JP 2006282100 A * 10/2006 ......... B60R 11/0235
JP 2010135204 A 6/2010
JP 2017037832 A 2/2017
JP 2020053405 A 4/2020
KR 101519349 5/2015
KR 101519349 B1 * 5/2015 ......... G02B 27/0149
KR 20150065318 6/2015
KR 20170061535 A 6/2017
KR 20180062573 A 6/2018
TW 200842448 A 11/2008
TW 200931120 A 7/2009
TW 202109160 A 3/2021
TW 202142936 A 11/2021
WO 2008127731 A1 10/2008
WO 2017097583 A1 6/2017
WO 2020008237 A1 1/2020
WO 2021242558 A2 12/2021

OTHER PUBLICATIONS

Translation of DE 102018110548 (Year: 2019).*
Office Action dated Dec. 20, 2022 from related German patent application No. 10 2022 205 051.7.
Search Report dated Nov. 16, 2023 from corresponding European patent application No. 23165875.8.
Search Report dated Nov. 14, 2023 from related European patent application No. 23165869.1.
Office Action dated Dec. 16, 2022 from corresponding German patent application No. 10 2022 205 052.5.
Office Action dated Dec. 14, 2022 from related German patent application No. 10 2022 205 083.5.
Search Report dated Oct. 20, 2023 from related European patent application No. 23170127.7.
Non-Final Office Action dated Sep. 6, 2023 from related U.S. Appl. No. 18/199,477.
Office Action dated Jan. 18, 2023 from related German patent application No. 10 2022 205 053.3.
Office Action issued on Oct. 22, 2024 from related Korean patent application No. 10-2023-0051654.
Office Action issued on Oct. 18, 2024 from related Korean patent application No. 10-2023-0063424.
Office Action dated Dec. 13, 2022 from related German patent application No. 10 2022 205 050.9.
Search Report dated Nov. 14, 2023 from related European patent application No. 23165862.6.
Notice to Submit Response of Korean Patent Application No. 10-2023-0051655, dated Jun. 17, 2025.
Notice of Decision of Rejection of Korean Patent Application No. 10-2023-0051656, dated Jun. 17, 2025.
Non-FInal Office Action mailed Feb. 12, 2025 from related U.S. Appl. No. 18/199,465.
Office Action received Aug. 2, 2024 from related Taiwan patent application No. 112118715.

(56) References Cited

OTHER PUBLICATIONS

Office Action of related U.S. Appl. No. 18/199,484 dated Sep. 11, 2025.
Office Action of related U.S. Appl. No. 18/199,465, dated Sep. 10, 2025.
Office Action of corresponding Chinese Patent Application No. 202310501940.8 dated Oct. 30, 2025 .
Office Action of related U.S. Appl. No. 18/199,454, dated Aug. 21, 2025.
Office Action of related U.S. Appl. No. 18/199,454 dated Jan. 16, 2026.
Office Action of related Korean Patent Application No. 10-2023-0051655, dated Feb. 10, 2026.
Office Action of related U.S. Appl. No. 18/199,484, dated, Dec. 19, 2025.
Office Action of related Chinese Patent Application No. 202310440351.3 dated Jan. 13, 2026.
Office Action of related U.S. Appl. No. 18/199,465 dated Jan. 26, 2026.
Office Action of related Chinese Patent Application No. 202310501940.8 dated Apr. 23, 2026.
Office Action of related U.S. Appl. No. 18/199,454 dated May 7, 2026.
Office Action of related Chinese Patent Application No. 202310501940.8 dated Jun. 27, 2026.

* cited by examiner a)

b)

c)

DISPLAY DEVICE, DASHBOARD AND TRANSPORTATION MEANS

CROSS REFERENCE TO RELATED APPLICATION

This U.S. patent application claims the benefit of German patent application No. 10 2022 205 052.5, filed May 20, 2022, which is hereby incorporated by reference.

TECHNICAL FIELD

The present disclosure relates to a display device and to a dashboard having such a display device. The disclosure moreover relates to a transportation means having such a dashboard.

BACKGROUND

Display devices for illustrating the relevant items of driving information, which are gradually replacing the classic pointer instruments, are frequently used in modern motor vehicles. These display devices are typically disposed in the dashboard behind the steering wheel.

However, in the event of an accident the steering column is pushed into the dashboard by virtue of the force of the airbag located in the steering wheel. In this movement there is the risk of the cover of the steering column impacting the periphery of the display device and destroying the latter. In order to avoid the splintering of glass in this event, a kinematic system that is triggered already upon the first movement of the steering column and automatically moves the display device from the collision region of the steering column is usually stipulated.

In current solutions, the force for this movement is provided by one or a plurality of strong springs. The latter are under tension during the entire service life of the product, until an accident occurs. The springs have to be sufficiently strong to lift the weight of the display device including the cover glass thereof and of the kinematic support within a very short time span in order to avoid the collision. The triggering typically takes place by a predetermined breaking point in the kinematic system such that the spring tension is absorbed by the kinematic support that is not triggered.

In this context, DE 10 2018 110 548 A1 describes a display assembly for a motor vehicle, comprising a display which in the vehicle height direction is disposed above a steering column; a guide on which the display is mounted so as to be movable in a translatory or rotary manner such that said display can be moved away from the steering column, out of a use position in which the display impedes a plunging movement of the steering column in the steering column direction; and a mechanism for fixing the display in the use position, which is conceived in such a manner that the display does not counter the plunging movement of the steering column with a force that exceeds a predefined force.

The solution described requires an additional kinematic support which is disposed between the housing of the display device and the fastening of the dashboard. Moreover, one or a plurality of springs and fastening elements are required.

It is an object of the disclosure to provide simplified solutions for protecting a display device of a transportation means in the event of an accident.

SUMMARY

According to a first aspect of the disclosure, a display device comprises a display module having a display panel, and a housing for receiving the display module, wherein the housing has resilient bistable fastening elements which are designed in such a manner that said fastening elements when responding to a movement of a steering column of the transportation means move the display device out of a collision region with the steering column or a steering wheel.

A complex kinematic system or the use of additional springs is dispensed with in the solution according to the disclosure. Instead, bistable fastening elements which instead of a material elasticity utilize a geometrical elasticity in order to cause a movement are used. Guiding of the movement of the display device here may take place solely by the geometrical design embodiment of the bistable elements. Since guiding can be dispensed with, friction is irrelevant. Moreover, fewer parts are required so that the assembly process is simplified and the costs are reduced. A further advantage of using bistable fastening elements lies in that the force required for jumping between the stable states may be very well controlled, this not being the case with a predetermined breaking point.

According to one aspect of the disclosure, the resilient bistable fastening elements are designed to cause an upward displacement of the display device or a rotation of the display device about a horizontal axis. A movement of the display device out of the collision region may be achieved by an upward displacement of the display device, thus in the z-direction, as well as by a rotation of the display device about a horizontal axis, in which the lower edge of the display device is likewise displaced in the z-direction. The horizontal axis here is for example in the region of the upper edge of the display device.

According to one aspect of the disclosure, a force required for triggering the movement is at least 500 N. A trigger force of this order renders any inadvertent triggering of the movement improbable. Moreover, undesirable vibrations in the operation of the transportation means are avoided so that no disturbing noise emission arises.

According to one aspect of the disclosure, the resilient fastening elements are an integral constituent part of the housing. No additional parts, and thus also no additional tools or production steps, are required. This leads to a more robust tolerance chain for the display device and potential gaps to adjacent components. Simultaneously, no dissimilar materials are combined, this reducing the potentially disruptive effects of temperature variations, e.g. deformations or the Mura effect resulting therefrom. Risks associated with corrosion are also reduced. The resilient fastening elements may be generated in the context of the production, e.g. by using a suitable mold or by subsequent stamping.

According to one aspect of the disclosure, the housing and the resilient fastening elements are made from a magnesium-based material. Magnesium is a material frequently used in the automotive sector, which is used in particular for housings of display devices. However, other materials may also be used, of course.

According to one aspect of the disclosure, the bistable elements implement a flexural buckling mechanism, a torsional buckling mechanism, or a flexural torsional buckling mechanism. In these mechanisms an arm of a bistable element snaps or jumps from a stable first state to a stable second state when a sufficient force is exerted. This rapid jumping action leads to a high acceleration of the housing in relation to the fastening points. An only translatory movement is caused in a flexural buckling mechanism, while instead a rotary movement is caused in a torsional buckling mechanism. A flexural torsional buckling mechanism combines a translatory and a rotary movement. In all cases, the initial plunging action of the steering column is only the trigger for the movement, while the mechanism subsequently accelerates the latter.

According to one aspect of the disclosure, an arm length of the bistable elements is chosen such that the resultant elastic deformation path enables a jump from a first state to a second state. Magnesium is a rather brittle material of only minor elasticity. If the housing and the bistable elements are made from a magnesium-based material, large lever arms are required in order to achieve the elastic deformation path required for the jumping action.

According to one aspect of the disclosure, the bistable elements when jumping from the first state to the second state are stressed beyond the yield point. This ensures that the bistable elements after the jumping action are no longer functional for this movement and therefore cannot be used a second time. Even if it were possible to permit the bistable elements to snap back into place, the strain hardening of the bistable elements would be problematic. However, this is a state which is entirely of minor importance in terms of an accident that has happened, Rather, it is indeed safety relevant that the triggering of the mechanism is clearly identifiable and the latter may no longer be used. It is mandatory that a mechanism once triggered must be replaced because the correct functioning would no longer be reliably guaranteed in the event of a second triggering.

A display device according to the disclosure is for example used in a dashboard for a transportation means. The display device here may be fastened to assigned fastening points of the dashboard by means of the resilient fastening elements. Such a dashboard offers improved protection from splinters for the display device and thus improved protection for the occupants of the transportation means.

A dashboard according to the disclosure is for example used in a transportation means. The transportation means may be, for example, a motor vehicle but alternatively also an aircraft, a rail vehicle, or a watercraft.

Further features of the present disclosure will be evident from the following description and the appended claims in conjunction with the figures.

DETAILED DESCRIPTION

Figure 1:
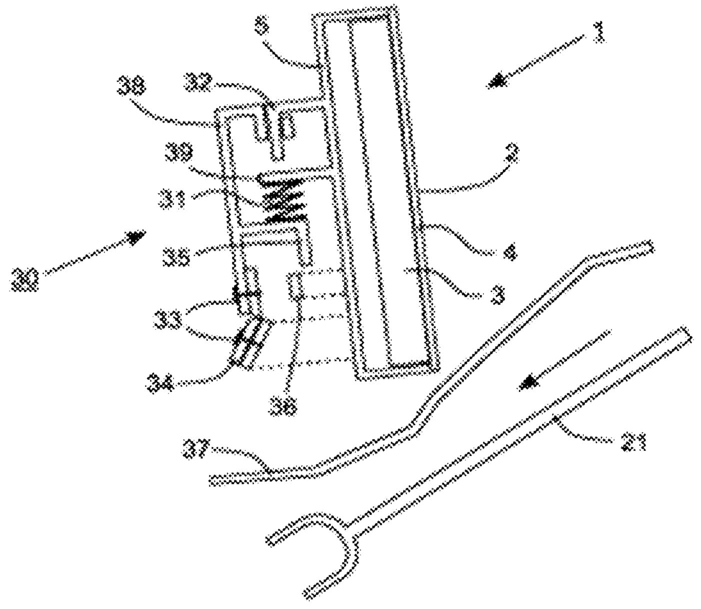
FIG. 1 schematically shows a display device for a transportation means, having a known protective mechanism.

For a better understanding of the principles of the present disclosure, embodiments of the disclosure will be explained in more detail below by means of the figures. The same reference signs are used in the figures for identical or functionally identical elements and are not necessarily described again for each figure. It is understood that the disclosure is not limited to the illustrated embodiments and that the described features may also be combined or modified without departing from the scope of protection of the disclosure as defined in the appended claims, FIG. 1 schematically shows a display device 1 for a transportation means, having a known protective mechanism 30. A lateral view is illustrated. The display device 1 has a display module 2, having a display panel 3 and a cover glass 4 which are disposed in a housing 5. The housing is fastened to a mounting 38 by way of a plurality of elements. An upper fastening element 32 is plugged into the mounting 38 so as to be movable therein. By means of two threaded connections 33, a threaded lug 34 having a predetermined breaking point establishes a fixed connection between the housing 5 and the mounting 38. A tensioned compression spring 31 which is disposed between the mounting 38 and a detent 39 of the housing 5, ensures pre-tensioning which may be utilized for a movement of the display device 1. In the event of an accident, the steering column 21 is displaced substantially in the longitudinal direction of the transportation means. The housing is conjointly moved in the process until the predetermined breaking point ruptures. As soon as this takes place, the display device 1 is moved in the z-direction by the compression spring 31 such that the cover glass 4 of the display device 1 does not collide with a cover 37 of the steering column 21. An arrestor hook 35 on the mounting 38, in combination with an arrestor element 36 on the housing 4, ensures that the display device 1 is held even after the displacement.

Figure 2:
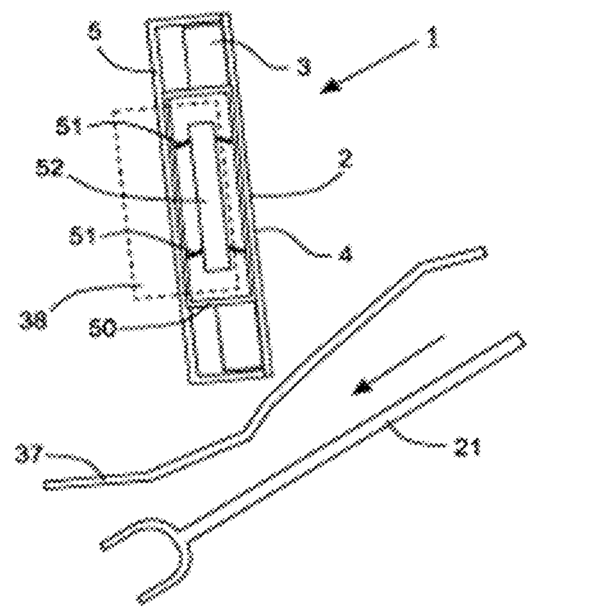
FIG. 2 schematically shows a display device according to the disclosure.

FIG. 2 schematically shows a display device 1 according to the disclosure, A lateral view is illustrated. The display device 1 has a display module 2, having a display panel 3 and a cover glass 4 which are disposed in a housing 5. In this case, however, the housing is fastened to a mounting 38 by way of a plurality of resilient bistable fastening elements 50. On the one hand, the resilient bistable fastening elements 50 ensure stable fastening of the display device 1 in the normal use position of the latter; on the other hand, however, said resilient bistable fastening elements 50 also cause a movement of the display device 1 in the z-direction in the event of an accident. The resilient bistable fastening elements 50 in the example illustrated have in each case four arms 51 which hold a movable central element 52 in a stable first position. The central element 52 is screwed to the mounting 38. In the event of an accident, the steering column 21 is displaced substantially in the longitudinal direction of the transportation means. In the process, the housing 5 is displaced in the z-direction, e.g. by means of a lever or a suitable detent face. After an initial displacement in the z-direction, the arms 51 jump or snap to a stable second position, as a result of which the housing 5 is moved further upward. It is ensured in this way that the cover glass 4 of the display device 1 does not collide with a cover 37 of the steering column 21.

Figure 3:
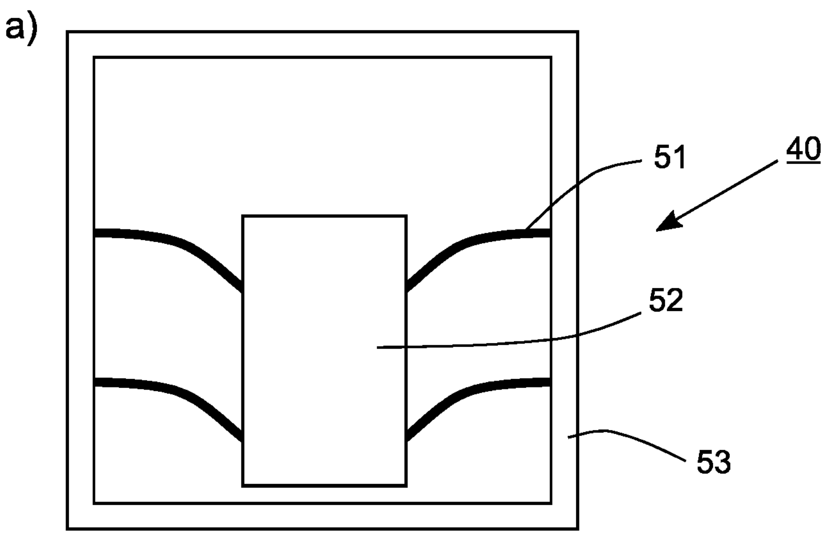
FIG. 3 schematically shows the functional mode of a first embodiment of a resilient bistable mechanism.
Figure 3:
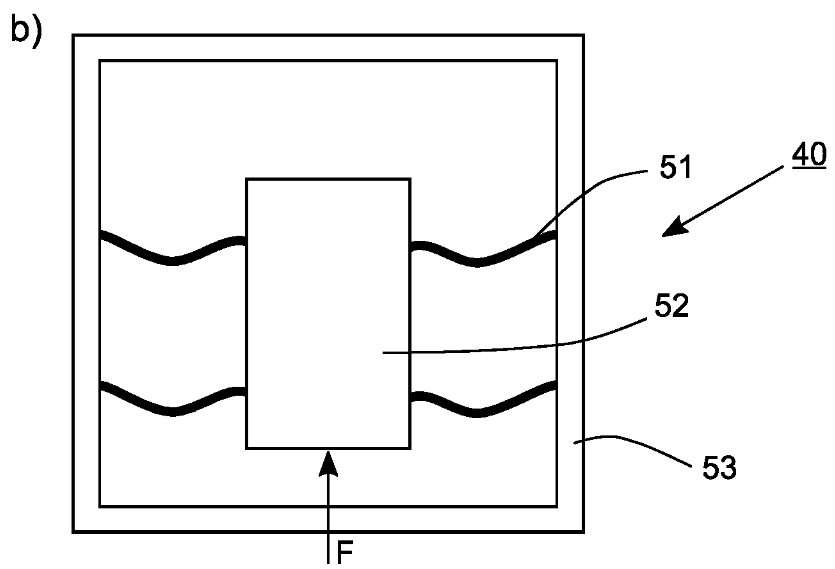
Figure 3:
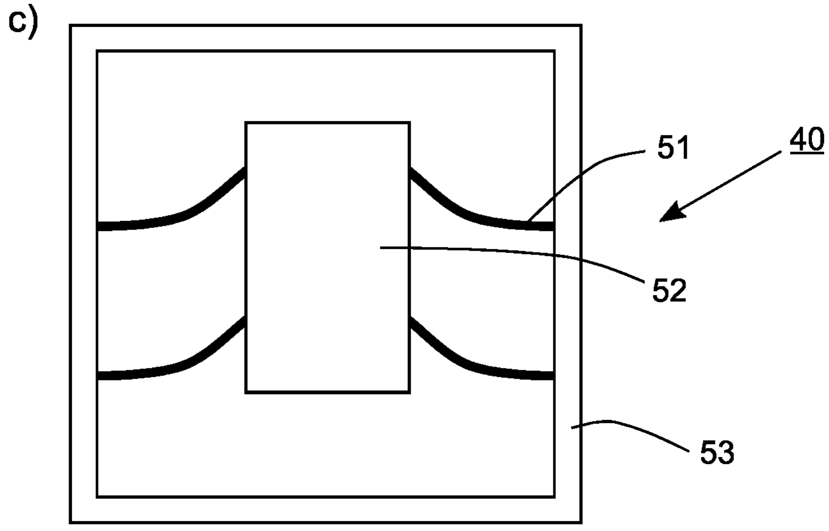

FIG. 3 schematically shows the functional mode of a first embodiment of a resilient bistable mechanism 40. Provided in this case are four elastic arms 51 which fix a central element 52 in relation to a frame 53. FIG. 3*a*) shows the situation after the resilient bistable mechanism has been fabricated. The arms 51 are relaxed, and the central element 52 is in a stable first position in relation to the frame 53. The absence of tension in the arms 51 is achieved in that the arms 51 are in the exact position in which said arms 51 were stamped or cast during production. If a force F is now exerted on the central element 52, as illustrated in FIG. 3*b*), the central element 52 is moved to an unstable intermediate position. The arms 51 are tensioned in the process. If the force F exceeds a required trigger force, the arms 51 jump or snap to a stable second position. This is illustrated in FIG.

3*c*). The arms 51 henceforth are relaxed again in this stable second position. A flexural buckling mechanism is implemented as a result of the jumping action of the arms 51 shown in FIG. 3. The resilient bistable mechanism may now be utilized to implement a translatory movement of a display device. For this purpose, the central element 52 may be fastened to the rear side of the display device, for example. In this case, each arm 51 forms one resilient bistable fastening element 50. It is likewise possible to provide in each case at least one resilient bistable mechanism 40 on two opposite sides of the display device, e.g. in that the central element 52 is screwed to the housing of the display device. In this case, the entire resilient bistable mechanism 40 forms in each case one resilient bistable fastening element 50.

Figure 4:
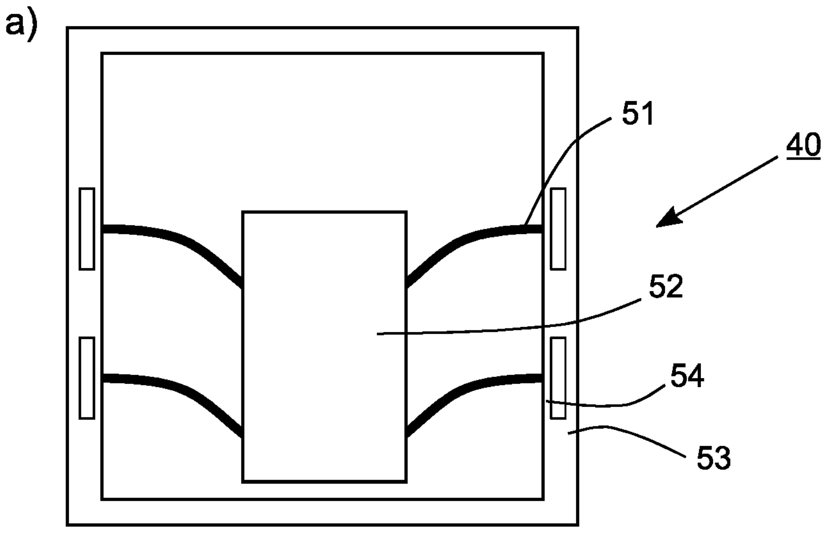
FIG. 4 schematically shows the functional mode of a second embodiment of a resilient bistable mechanism.
Figure 4:
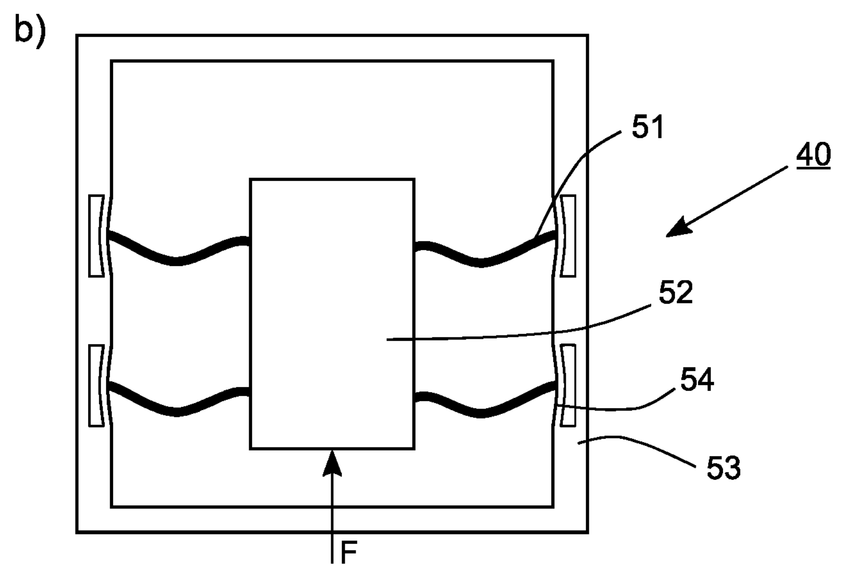
Figure 4:
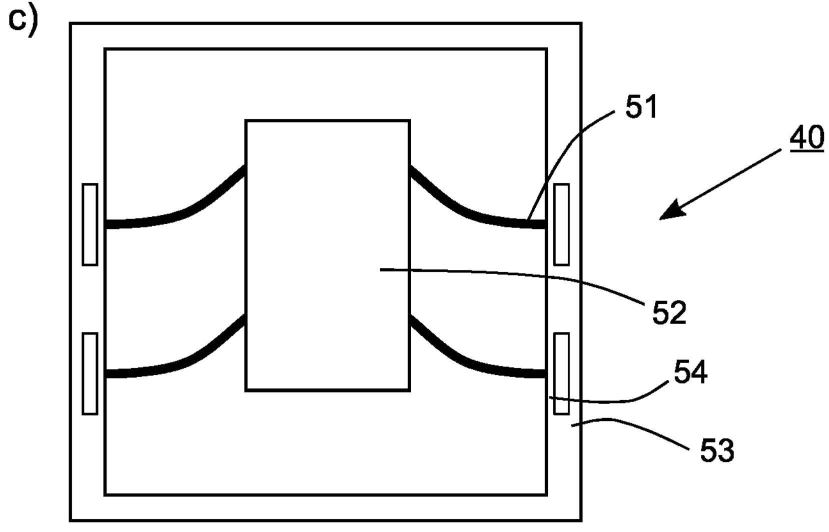

FIG. 4 schematically shows the functional mode of a second embodiment of a resilient bistable mechanism 40. Provided in this case are also four elastic arms 51 which fix a central element 52 in relation to a frame 53. Additionally, the resilient bistable mechanism 40 also has one flexible shoulder 54 for each arm 51. FIG. 4*a*) shows the situation after the resilient bistable mechanism has been fabricated. The arms 51 and the flexible shoulders 54 are relaxed, and the central element 52 is in a stable first position in relation to the frame 53. If a force F is now exerted on the central element 52, as illustrated in FIG. 4*b*), the central element 52 is moved to an unstable intermediate position. The arms 51 and the flexible shoulders 54 are tensioned in the process. If the force F exceeds a required trigger force, the arms 51 jump or snap to a stable second position. This is illustrated in FIG. 4*c*). The arms 51 and the flexible shoulders 54 henceforth are relaxed again in this stable second position.

Figure 5:
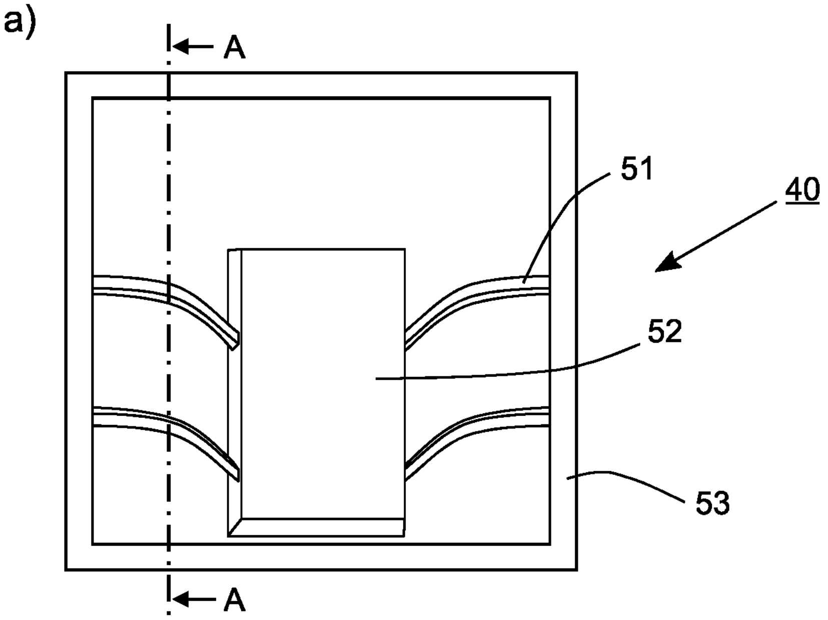
FIG. 5 schematically shows the functional mode of a third embodiment of a resilient bistable mechanism.
Figure 5:
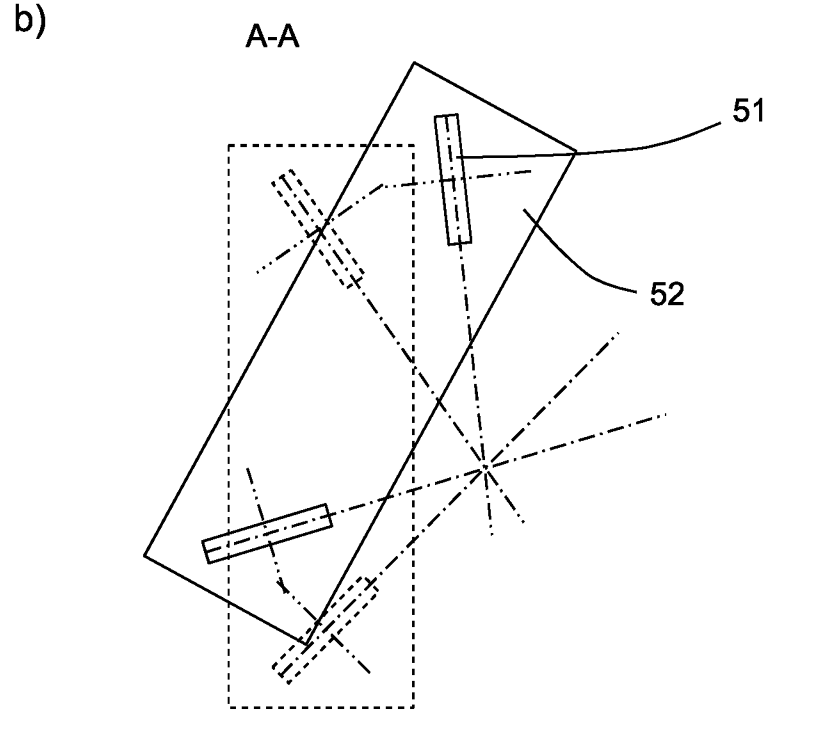

FIG. 5 schematically shows the functional mode of a third embodiment of a resilient bistable mechanism 40. Provided again are four elastic arms 51 which fix a central element 52 in relation to a frame 53. FIG. 5*a*) shows the situation after the resilient bistable mechanism has been fabricated. The arms 51 are relaxed, and the central element 52 is in a stable first position in relation to the frame 53. However, the arms 51 are inherently twisted. If a force is now exerted on the central element 52, the central element 52 is moved to an unstable intermediate position. The arms 51 are tensioned in the process. If the force exceeds a required trigger force, the arms 51 jump or snap to a stable second position. This may be seen in FIG. 5*b*), which shows a section along the axis A-A through the resilient bistable mechanism 40. The arms 51 henceforth are relaxed again in this stable second position. For comparison, the first position is illustrated in dashed lines. A torsional buckling mechanism is implemented as a result of the jumping action of the arms 51 shown in FIG. 5. The resilient bistable mechanism may now be utilized to implement a rotary movement of a display device. For this purpose, the central element 52 may be fastened to the rear side of the display device, for example. In this case, each arm 51 forms one resilient bistable fastening element 50.

Figure 6:
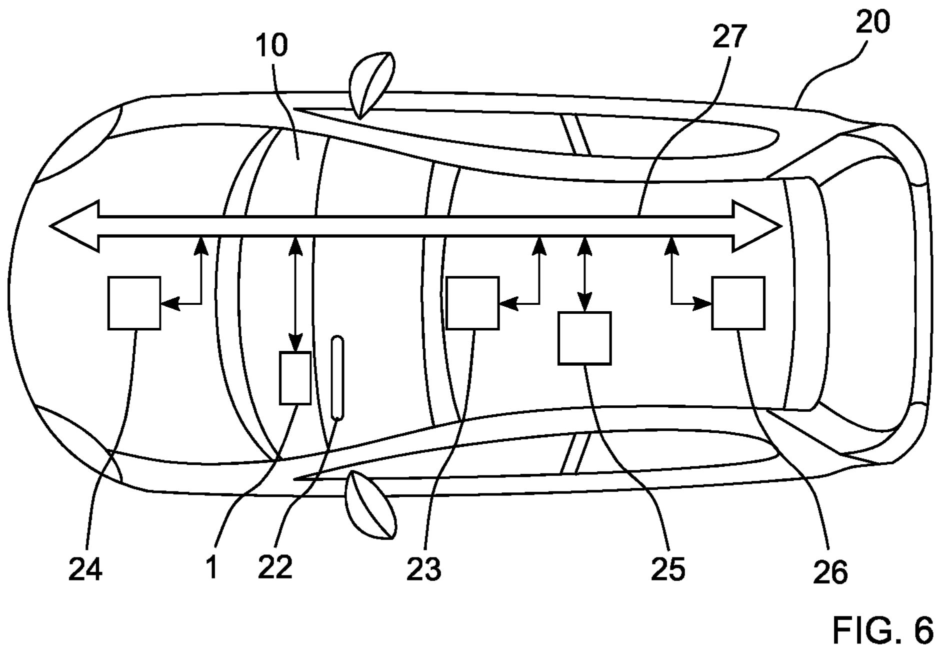
FIG. 6 schematically shows a transportation means that utilizes a display device according to the disclosure.

FIG. 6 schematically shows a transportation means 20 that utilizes a display device 1 according to the disclosure. The transportation means 20 is a motor vehicle in this example. The motor vehicle has a display device 1 according to the disclosure, which is disposed in a dashboard 10 behind the steering wheel 22. Data on the vehicle surroundings can be acquired by a sensor system 23. The sensor system 23 may in particular comprise surroundings recognition sensors, for example ultrasound sensors, laser scanners, radar sensors, lidar sensors or cameras. The information acquired by the sensor system 23 may be used to generate content to be displayed for the display device. Further constituent parts of the motor vehicle in this example are a navigation system 24, by which positional information may be provided, and also a data transmission unit 25. A connection to a back-end, for example for receiving updated software for components of the motor vehicle, may, for example, be established by means of the data transmission unit 25. A memory 26 is present for storing data. Data is exchanged between the various components of the motor vehicle via a network 27.

The invention claimed is:

1. A display device for transportation, comprising:

a display module having a display panel; and a housing for receiving the display module, wherein the housing has resilient bistable fastening elements configured as a plurality of elastic arms which are designed in such a manner that said fastening elements when responding to a movement of a steering column of the transportation move the display device out of a collision region with the steering column or a steering wheel, wherein the plurality of elastic arms fix a central element in relation to a frame, the elastic arms being configured to:

maintain the central element in a first stable position;

transition the central element through an unstable intermediate position; and snap the central element into a second stable position.

2. The display device as claimed in claim 1, wherein the resilient bistable fastening elements are designed to cause an upward displacement of the display device or a rotation of the display device about a horizontal axis.

3. The display device as claimed in claim 1, wherein a force required for triggering the movement is at least 500 N.

4. The display device as claimed in claim 1, wherein the resilient bistable fastening elements are an integral constituent part of the housing.

5. The display device as claimed in claim 1, wherein the housing and the resilient bistable fastening elements are made from a magnesium-based material.

6. The display device as claimed in claim 1, wherein the resilient bistable fastening elements implement a flexural buckling mechanism, a torsional buckling mechanism, or a flexural torsional buckling mechanism.

7. The display device as claimed in claim 1, wherein an arm length of the resilient bistable fastening elements is chosen such that a resultant elastic deformation path enables a jump from a first state to a second state.

8. The display device as claimed in claim 7, wherein the resilient bistable fastening elements when jumping from the first state to the second state are stressed beyond a yield point.

9. A dashboard for transportation, comprising:

a display device, comprising:

a display module having a display panel; and a housing for receiving the display module, wherein the housing has resilient bistable fastening elements configured as plurality of elastic arms which are designed in such a manner that the fastening elements when responding to a movement of a steering column of the transportation move the display device out of a collision region with the steering column or a steering wheel, and wherein the display device by the resilient bistable fastening elements is fastened to assigned fastening points of the dashboard, wherein the plurality of elastic arms fix a central element in relation to a frame, the elastic arms being configured to:

maintain the central element in a first stable position;

transition the central element through an unstable intermediate position; and snap the central element into a second stable position.

10. A motor vehicle comprising:

a dashboard, comprising:

a display device, comprising:

a display module having a display panel; and a housing for receiving the display module, wherein the housing has resilient bistable fastening elements configured as a plurality of elastic arms which are designed in such a manner that the fastening elements when responding to a movement of a steering column of the transportation move the display device out of a collision region with the steering column or a steering wheel, and wherein the display device by the resilient bistable fastening elements is fastened to assigned fastening points of the dashboard, wherein the plurality of elastic arms fix a central element in relation to a frame, the elastic arms being configured to:

maintain the central element in a first stable position;

transition the central element through an unstable intermediate position; and snap the central element into a second stable position.

* * * * *